No. 680,262. Patented Aug. 13, 1901.
W. E. MACK.
THERMO-ELECTRIC REGULATOR FOR VALVES OR DAMPERS.
(Application filed July 21, 1900.)
(No Model.) 2 Sheets—Sheet 1.
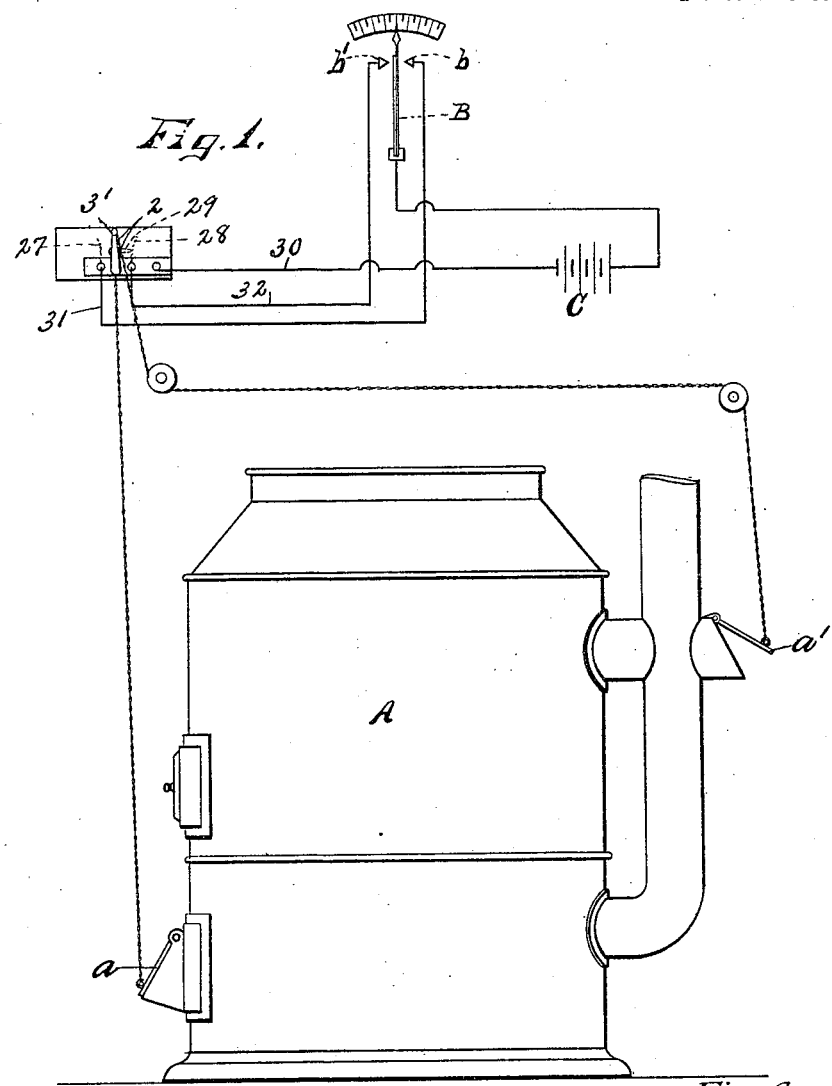
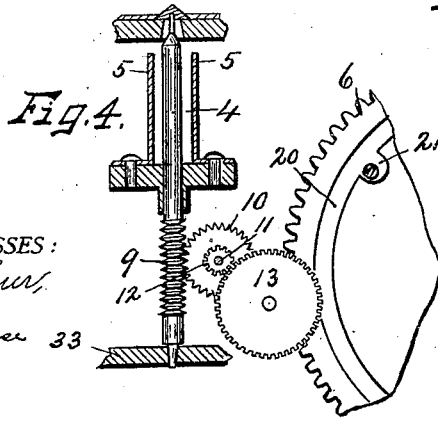
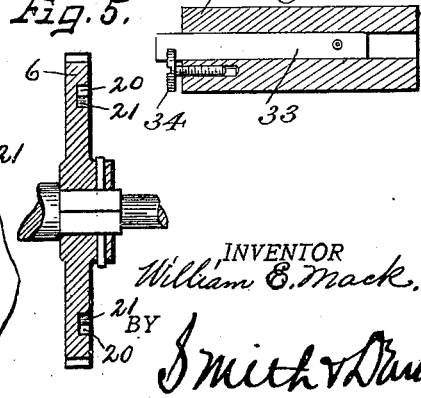
WITNESSES:
INVENTOR
William E. Mack.
BY
ATTORNEYS
THE NORRIS PETERS CO., PHOTO-LITHO., WASHINGTON, D. C.

No. 680,262. Patented Aug. 13, 1901.
W. E. MACK.
THERMO-ELECTRIC REGULATOR FOR VALVES OR DAMPERS.
(Application filed July 21, 1900.)
(No Model.) 2 Sheets—Sheet 2.

WITNESSES:
F.C. Arthur,
H.E. Chase.

INVENTOR
William E. Mack,
BY
Smith & Hudson
ATTORNEYS

THE NORRIS PETERS CO., PHOTO-LITHO., WASHINGTON, D. C.

UNITED STATES PATENT OFFICE.

WILLIAM E. MACK, OF OSWEGO, NEW YORK.

THERMO-ELECTRIC REGULATOR FOR VALVES OR DAMPERS.

SPECIFICATION forming part of Letters Patent No. 680,262, dated August 13, 1901.

Application filed July 21, 1900. Serial No. 24,417. (No model.)

*To all whom it may concern:*

Be it known that I, WILLIAM E. MACK, of Oswego, in the county of Oswego, in the State of New York, have invented new and useful Improvements in Thermo-Electric Regulators for Valves or Dampers, of which the following, taken in connection with the accompanying drawings, is a full, clear, and exact description.

This invention relates to improvements in thermo-electric regulators for valves or dampers, and has for its object the production of means controlled by a thermostat coöperating with a heat-generating apparatus for automatically regulating the temperature of a room or compartment, and thereby maintaining a substantially uniform degree of heat or cold therein, as desired.

To this end the invention consists in the combination, construction, and arrangement of the component parts of a device for the purpose mentioned, as hereinafter fully described, and pointed out in the claims.

Figure 2:
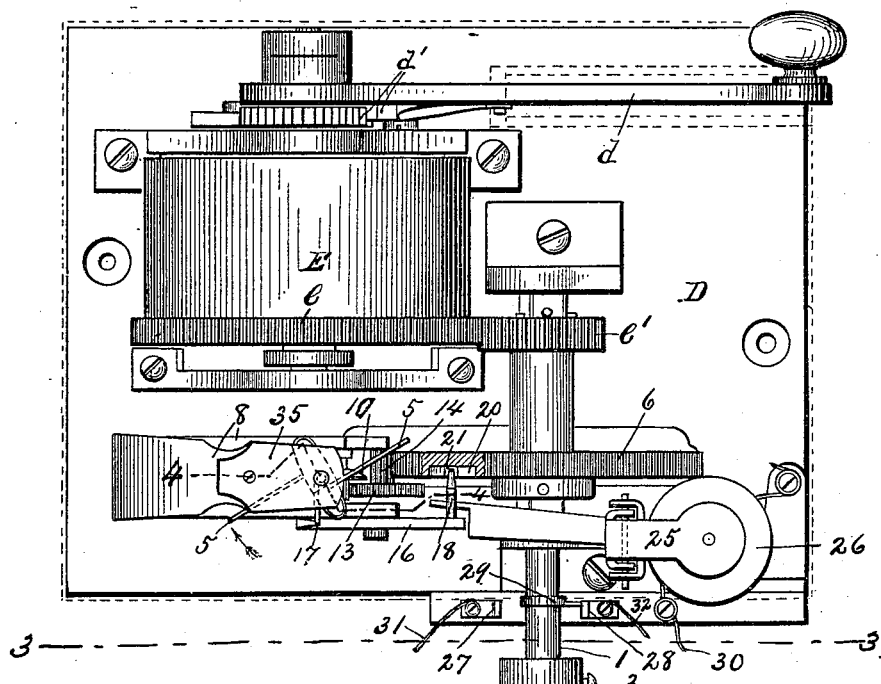
Figure 3:
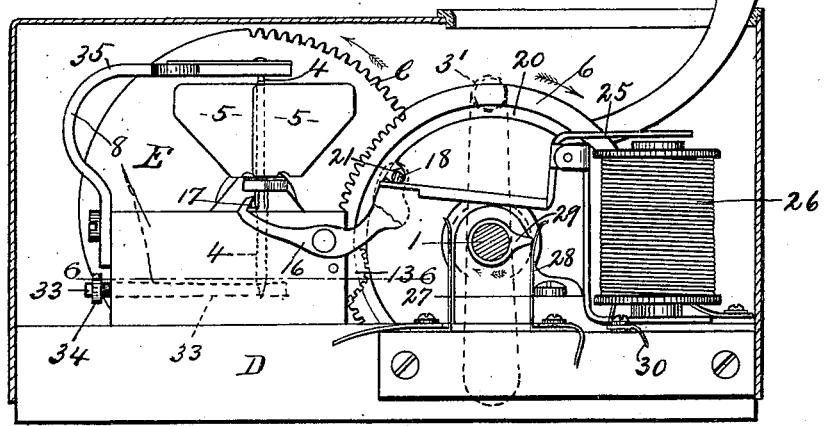

In the accompanying drawings, Figure 1 represents my invention shown diagrammatically as connected to a heater, as a furnace. Fig. 2 is an enlarged top plan of my invention shown as operatively connected to a spring-motor, the thermostat being omitted and the inclosing cap being shown in dotted lines. Fig. 3 is a sectional view taken on line 3 3, Fig. 2, showing the essential features of my invention seen in Fig. 2, the cap being shown in section. Fig. 4 is a sectional view taken on line 4 4, Fig. 1, showing a portion of the motor-actuated mechanism and the means for regulating the speed of said mechanism. Fig. 5 is a sectional view through one of the operating members for controlling the movement of the motor. Fig. 6 is a sectional view taken on line 6 6, Fig. 3.

The elements of novelty embodied in this invention consist, essentially, as follows, viz: First, motor-actuated means for operating one or more dampers or valves of a heater; second, governor mechanism for regulating the speed of movement of said means; third, stop mechanism for the governor; fourth, electrically-operated means controlled by the thermostat for releasing the stop mechanism, and, fifth, manually-operated means for rewinding the motor-actuating device.

The invention also consists in other novel elements hereinafter described, and set forth in the claims.

The apparatus used in connection with my invention for the purpose of varying the temperature of the apartment in which the thermostat is located may be of any desired form or construction provided with suitable valves or dampers for controlling the degree of heat or cold generated therein.

In Fig. 1 I have shown an ordinary heating apparatus consisting of a furnace A, which is provided with the usual draft-damper *a* for controlling the supply of air to the combustion-chamber, and with a check-damper *a'*, preferably connected to the smoke-flue, for the purpose well known.

B represents an ordinary thermostat, consisting of the usual composition metal, mounted on a suitable support and electrically connected to a source of electric energy, as a battery C. The free end of the thermostat is movable by means of the varying temperature into and out of contact with points *b b'*, forming a part of the battery-circuit, and are intermittently or alternately connected in a manner hereinafter described for controlling the operation of an independent valve or damper operating mechanism, also hereinafter described and preferably consisting of the motor-actuated means previously mentioned. This damper-operating mechanism preferably consists of a revoluble shaft 1 and a double or U-shaped crank 2, having one of its arms, as 3, secured to the shaft 1, and its other arm, as 3', united to the former arm 3, at one side of the axis of the shaft 1, and extended beyond the opposite side of said axis. As seen in Fig. 1, the draft-damper *a* is connected by a chain or its equivalent to the crank-arm 3, or, more properly, to the point of union between the arms 3 3', and the check-damper *a'* is connected by a similar chain or equivalent to the free end of the crank-arm 3'. The shaft 1, Figs. 2 and 3, is journaled in suitable bearings mounted on a base D and is actuated by any desired form of motor, also preferably mounted on said base and consisting of an ordinary coil-spring (not seen in the drawings) inclosed in the usual inclosing case, as a revoluble cylindrical shell E, actuated by said spring and provided with a gear e, meshing with a pinion e', secured to the shaft 1.

In order to retension the spring of the motor E, I preferably provide the same with a permanent rewinding attachment, as a lever d, which may be connected to the rewinding-shaft of the spring in any well-known manner, as by means of the ordinary pawl and ratchet d', Fig. 2.

The mechanism for regulating the speed of movement of the damper-operating mechanism is preferably independent of the motor mechanism, and although incidentally controlling the action of the motor, as seen in the drawings, its primary function is to control the damper-actuating mechanism. It is evident, however, that the connections between said motor and the shaft 1 may be so arranged as to permit the motor to continue its movement during the interruption of movement of the damper-operating mechanism and to again take up the movement of said damper-operating mechanism when the thermostatic conditions render it necessary. This speed-regulating mechanism, as seen in Figs. 1, 2, 3, and 4, consists of a revoluble spindle 4, journaled in suitable bearings mounted on the base D and provided with fan-blades 5 5, and a revoluble member preferably consisting of a gear 6, secured to the shaft 1. As preferably constructed the spindle 4 is journaled on a bracket 8, detachably mounted on the base D, and is provided with a worm 9, meshing with a worm-gear 10, revolubly supported on said bracket 8. The worm-gear 10 is mounted on a spindle 11, journaled on the bracket 8, and is connected by a train of gears 12, 13, and 14 to the gear 6 of the shaft 1. These gears 6, 12, 13, and 14 are so relatively proportioned in size as to materially decrease the strain upon the fan-governor, thereby reducing to a minimum the resistance necessary to control the speed of movement of the gear 6 and the damper-operating mechanism connected thereto.

It will be noted that the above-described speed-regulator is particularly simple, is noiseless in operation, and on account of the differential sizes of gears connected thereto requires but a small fan-blade to effect the desired result.

The stop mechanism for the governor is automatically controlled by means provided on the gear 6 and consists of a gravity detent or pawl 16, preferably pivoted to the bracket 8 and having one end adapted to engage an arm 17, provided on the governor, and its other end weighted and provided with an extension 18. The means provided on the gear 6 for controlling the movement of the stop mechanism preferably consists of an annular groove 20 and recesses 21, communicating with the groove 20, said groove and recesses being usually formed in one of the side faces of said gear 6.

The electrically-operated means controlled by the thermostat for releasing the stop mechanism and the governor preferably consists of the armature 25 of an electromagnet 26, terminals 27 28, and a contact-piece 29. The magnet 26 and base D are connected in the battery-circuit by a wire 30. The terminals 27 and 28 are connected by independent wires 31 and 32 to the contact-points b b', and the contact-piece 29 is secured to the shaft 1 and, together with said shaft, is in electrical connection with the wire 30 through the magnet 26, which is electrically connected to the base D.

It will be evident to those skilled in this art that any variation from the desired degree of temperature for which the thermostat is adjusted causes a deflection of the thermostat into contact with one or the other of the contact-points b b', and thereby closes the battery-circuit, energizes the magnet 26, and moves the armature 25 for releasing the stop-pawl 16 and the governor mechanism, it being understood that the contact-piece 29 is normally in contact with one of the terminals 27 28 when the governor and damper-operating mechanisms are held from movement. This contact-piece 29 and the terminals 27 28 are so relatively arranged as to maintain a closed circuit until the recess of the disk or gear 6, normally alined with the adjacent portion of the pawl 16, has moved out of registration with said pawl.

In order to insure a perfect and noiseless engagement between the worm and worm-gear of the governor and for the purpose of taking up the wear between said parts, I preferably journal the lower end of the spindle 4 in an adjustable bearing-plate 33, (shown by dotted lines, Fig. 3, and in section, Fig. 4,) which is mounted on the bracket 8 and is engaged by an adjusting-screw 34, also mounted on said bracket, for moving the plate 33 and the worm 9 toward and away from the worm-gear 10 and pawl 16. The upper end of the spindle 4 is preferably journaled in a jewel-bearing mounted in an arm 35, which is detachably secured to the bracket 8.

The operation of my invention will now be readily understood upon reference to the foregoing description and the accompanying drawings, and it will be noted that the form and construction of the parts of my invention may be somewhat varied without departing from the spirit thereof. Therefore I do not limit myself to the precise construction and arrangement shown and described.

Having thus fully described my invention, what I claim, and desire to secure by Letters Patent, is—

1. In a thermo-electric regulator for valves or dampers, the combination with a motor-actuated rotary shaft connected to actuate the valve or damper and provided with a member having an annular groove and a recess communicating therewith, an upright rotary spindle actuated by the shaft and provided with one or more upright blades, a gravity-pawl having its weighted end provided with a shoulder normally resting on one of the walls of the groove and adapted to drop into said cut-out for forcing the other end of the pawl into engagement with a moving portion of the governor for interrupting its movement, electrically-actuated means independent of the pawl for engaging and actuating the weighted end of the pawl to release the governor, terminals connected in the electric circuit, a thermostat connected in the circuit and adapted to contact with one of the terminals, and a contact-piece on the shaft arranged to close the circuit through the other terminal.

2. In a thermo-electric regulator for valves or dampers, the combination with a thermostat and a motor-actuated crank connected to the valve or damper, of an adjustable bearing, an upright spindle journaled on the bearing and actuated by the motor, upright fan-blades secured to the spindle, a pawl controlled by the motor for stopping the governor, means for adjusting the bearing toward and from the pawl, and electrically-actuated means independent of said pawl and controlled by the thermostat and motor for actuating the pawl to release the governor.

3. A thermo-electric regulator for valves or dampers comprising a motor, a shaft rotated by the motor and provided with a crank-arm connected to the valve or damper for operating the same, a gear secured to the shaft and provided with a groove and one or more recesses communicating with the groove, a governor connected to the gear for controlling the speed of the motor, a stop guided in the groove and adapted to move automatically into the recesses for interrupting the movement of the governor, and thereby interrupting the movement of the gear and motor, and thermostatic-controlled electric means independent of the pawl for forcing the stop out of the recess and thereby releasing the governor and motor.

4. A thermo-electric regulator for valves or dampers comprising a motor, a shaft rotated by the motor and provided with a crank-arm connected to the valve or damper for operating the same, a gear secured to the shaft and provided with a groove, and one or more recesses in one of its side faces communicating with the groove, a governor connected to the gear for controlling the speed of the motor, a stop consisting of a gravity-pawl having its weighted end extended into the groove and adapted to drop into the recess for forcing its other end into engagement with the governor for interrupting the movement of the governor and the shaft and motor connected thereto, and thermostatic-controlled electric means independent of the pawl for forcing the stop out of the recess, and thereby releasing the governor and motor.

5. A thermo-electric regulator for valves or dampers comprising a motor-actuated shaft having oppositely-projecting crank-arms, a gear secured to the shaft and provided with an annular groove and recesses in one of its side faces communicating with the groove, a revoluble spindle having fan-blades and a worm, a worm-gear meshing with said worm, additional gears connecting said worm-gear with the former gear, a pivoted pawl having one end provided with a stop guided in the groove and movable by gravity into the recesses of the former gear for forcing the other end of the pawl into engagement with the governor for interrupting the movement of said former gear and the governor, an electromagnet connected in an electric circuit and having its armature independent of the pawl adapted to move the stop out of the recesses for releasing the governor and mechanism connected thereto, independent terminals and contact-points electrically connected to each other, a contact-piece on the shaft connected in said circuit and adapted to engage each of the terminals, and a thermostat having its movable finger connected in the circuit and adapted to contact with either of the points for closing the circuit through the electromagnet.

In witness whereof I have hereunto set my hand this 17th day of July, 1900.

WILLIAM E. MACK.

Witnesses:
G. B. MACK,
B. M. J. VAN PATTEN.